US012810203B2

(12) United States Patent
Kotler et al.

(10) Patent No.: US 12,810,203 B2
(45) Date of Patent: Nov. 24, 2026

(54) ALLOCATING COMPUTATIONS OF A MACHINE LEARNING NETWORK IN A MACHINE LEARNING ACCELERATOR

(71) Applicant: SiMa Technologies, Inc., San Jose, CA (US)

(72) Inventors: Reed Kotler, San Jose, CA (US); Nishit Shah, Sunnyvale, CA (US)

(73) Assignee: SiMa Technologies, Inc., San Jose, CA (US)

( * ) Notice: Subject to any disclaimer, the term of this patent is extended or adjusted under 35 U.S.C. 154(b) by 781 days.

(21) Appl. No.: 18/341,370

(22) Filed: Jun. 26, 2023

(65) Prior Publication Data

US 2023/0334374 A1 Oct. 19, 2023

Related U.S. Application Data

(63) Continuation of application No. 16/862,515, filed on Apr. 29, 2020, now Pat. No. 11,734,605.

(51) Int. Cl.
*G06N 20/00* (2019.01)
*G06N 3/04* (2023.01)

(52) U.S. Cl.
CPC ............... *G06N 20/00* (2019.01); *G06N 3/04* (2013.01)

(58) Field of Classification Search
None
See application file for complete search history.

(56) References Cited

U.S. PATENT DOCUMENTS 9,928,460 B1 3/2018 Nowatzyk et al.
2001/0029520 A1 10/2001 Miyazaki et al.
2005/0257194 A1 11/2005 Morrow et al.
2013/0297370 A1 11/2013 Pegden
2016/0379686 A1* 12/2016 Burger .................. G06F 3/0631 711/170
2017/0103299 A1* 4/2017 Aydonat ................. G06N 3/045
2017/0178386 A1 6/2017 Redshaw et al.
2019/0004878 A1 1/2019 Adler et al.
2019/0018815 A1 1/2019 Fleming et al.
2019/0076031 A1 3/2019 Valys et al.
(Continued)

OTHER PUBLICATIONS

Chang et al., "Compiling Deep Learning Models for Custom Hardware Accelerators," arXiv, 2017. (Year: 2017).*
(Continued)

*Primary Examiner* — Ryan D. Coyer
(74) *Attorney, Agent, or Firm* — Fenwick & West LLP

(57) ABSTRACT

A compiler receives a description of a machine learning network and generates a computer program that implements the machine learning network. The compiler allocates instructions of the computer program to different groups of processing elements (Tiles) for execution such that different groups of Tiles implement different layers of the machine learning network. The compiler may determine the size of the different groups based on a partial computation metric associated with the computations performed to implement the corresponding layer. Furthermore, the compiler may assign specific Tiles to each group based on a set of predefined layout constraints. The compiler may statically schedule at least a portion of the instructions into one or more deterministic phases for execution by the groups of Tiles.

13 Claims, 14 Drawing Sheets

(56) References Cited

U.S. PATENT DOCUMENTS

| | | | | |
|---|---|---|---|---|
| 2019/0114548 | A1 | 4/2019 | Wu et al. | |
| 2019/0155768 | A1 | 5/2019 | Wilkinson et al. | |
| 2019/0205737 | A1 | 7/2019 | Bleiweiss et al. | |
| 2019/0279038 | A1* | 9/2019 | Nicol | G06F 18/2148 |
| 2019/0286973 | A1 | 9/2019 | Kovvuri et al. | |
| 2019/0303346 | A1 | 10/2019 | Brewer | |
| 2019/0391796 | A1* | 12/2019 | Brady | G06F 8/458 |
| 2020/0007342 | A1 | 1/2020 | Liem et al. | |
| 2020/0012536 | A1 | 1/2020 | Lacey et al. | |
| 2020/0012537 | A1 | 1/2020 | Lacey et al. | |
| 2020/0073830 | A1 | 3/2020 | Verrilli et al. | |
| 2020/0090383 | A1 | 3/2020 | Dwivedi | |
| 2020/0133914 | A1 | 4/2020 | Wilkinson et al. | |
| 2020/0150713 | A1* | 5/2020 | Knowles | G06F 9/54 |
| 2020/0272892 | A1* | 8/2020 | Desappan | G06F 12/0804 |
| 2020/0320403 | A1 | 10/2020 | Daga et al. | |
| 2021/0150324 | A1* | 5/2021 | Liu | G06N 3/063 |
| 2021/0174137 | A1 | 6/2021 | Kim et al. | |
| 2021/0197967 | A1 | 7/2021 | Song et al. | |
| 2021/0201526 | A1 | 7/2021 | Moloney et al. | |
| 2021/0240524 | A1 | 8/2021 | Gangani et al. | |
| 2021/0278810 | A1 | 9/2021 | Heesche et al. | |
| 2022/0044153 | A1 | 2/2022 | Madar et al. | |

OTHER PUBLICATIONS

Sotoudeh et al., "ISA Mapper: A Compute and Hardware Agnostic Deep Learning Compiler," arXiv, 2018. (Year: 2018).*

Xing et al., "An In-depth Comparison of Compilers for Deep Neural Networks on Hardware," IEEE, 2019. (Year: 2019).*

Andri et al., "YodaNN: An Architecture for Ultralow Power Binary-Weight CNN Acceleration", IEEE Transactions on Computer-Aided Design of Integrated Circuits and Systems, vol. 37, No. 1, Jan. 2018, pp. 48-60.

Ankit et al., "PUMA: A Programmable Ultra-efficient Memristor-based Accelerator for Machine Learning Inference", ASPLOS'19, Apr. 13-17, 2019, Providence, RI, USA, pp. 715-731.

Du et al., "ShiDianNao: Shifting Vision Processing Closer to the Sensor", ISCA'15, Jun. 13-17, 2015, Portland, OR, USA, pp. 92-104.

Everson et al., "A 104.8TOPS/W One-Shot Time-Based Neuromorphic Chip Employing Dynamic Threshold Error Correction in 65nm", IEEE Asian Solid-State Circuits Conference Nov. 5-7, 2018/Tainan, Taiwan, pp. 273-276.

Guha, A. et al., "Deepframe: A Profile-Driven Compiler for Spatial Hardware Accelerators," 2019 28th International Conference on Parallel Architectures and Compilation Techniques (PACT), Sep. 23-26, 2019, pp. 68-81.

International Search Report and Written Opinion, PCT Patent Application No. PCT/US2021/027998, Aug. 25, 2021, 22 pages.

Jiao et al., "A 12nm Programmable Convolution-Efficient Neural-Processing-Unit Chip Achieving 825TOPS", ISSCC 2020, Session 7, Feb. 18, 2020, 5 pages.

Reuther et al., "Survey and Benchmarking of Machine Learning Accelerators", 2019 IEEE High Performance Extreme Computing Conference (HPEC) Sep. 24-26, 2019, pp. 1-9.

Shawahna et al., "FPGA-Based Accelerators of Deep Learning Networks for Learning and Classification: A Review", IEEE Access, vol. 7, 2019, pp. 7823-7858.

United States Office Action, U.S. Appl. No. 16/865,226, filed Jan. 13, 2023, 14 pages.

United States Office Action, U.S. Appl. No. 16/865,226, filed Jul. 14, 2022, 12 pages.

United States Office Action, U.S. Appl. No. 16/862,515, filed Aug. 17, 2022, 30 pages.

* cited by examiner

| | C 1-4 | C 5-12 | C 13-16 | C 17-24 | C 25-28 | C 29-32 | C 33-40 |
|---|---|---|---|---|---|---|---|
| Tile 1 | Load W1,X1 | P1=W1xX1 | Load W2,X2 | P2=W2xX2 | P3=P1+P2 | Load W3,X3 | P4=W3xX3 |

| | C 41-44 | C 45-48 | C 49-56 | C 57-60 | C 61-64 | C 65-68 |
|---|---|---|---|---|---|---|
| Tile 1 | P5=P3+P4 | Load W4,X4 | P6=W4xX4 | P7=P5+P6 | Y=F(P7) | Store Y |

FIG. 8A

| | C 1-4 | C 5-20 | C 21-24 | C 25-28 | C 29-32 | C 33-36 | C 37-40 | C 41-44 |
|---|---|---|---|---|---|---|---|---|
| Tile 1 | Load W1,X1 | P1=W1xX1 | Move P1 to Tile 2 | | | | | |
| Tile 2 | Load W2,X2 | P2=W2xX2 | [P1 available] | P5=P1+P2 | Move P5 to Tile 4 | | | |
| Tile 3 | Load W3,X3 | P3=W3xX3 | Move P3 to Tile 4 | | | | | |
| Tile 4 | Load W4,X4 | P4=W4xX4 | [P3 available] | P6=P3+P4 | [P5 available] | P7=P5+P6 | Y=F(P7) | Store Y |

FIG. 8B

| | C 1-4 | C 5-20 | C 21-24 | C 25-28 | C 29-32 | C 33-36 | C 37-40 | C 41-44 | C 45-48 |
|---|---|---|---|---|---|---|---|---|---|
| Tile 1 | Load W1,X1 | P1=W1xX1 | Move P1 to Tile 5 | | | | | | |
| Tile 2 | Load W2,X2 | P2=W2xX2 | Move P2 to Tile 5 | | | | | | |
| Tile 3 | Load W3,X3 | P3=W3xX3 | Move P3 to Tile 6 | | | | | | |
| Tile 4 | Load W4,X4 | P4=W4xX4 | Move P4 to Tile 6 | | | | | | |
| Tile 5 | | | [P1,P2 Available] | P5=P1+P2 | Move P5 to Tile 7 | | | | |
| Tile 6 | | | [P3,P4 Available] | P6=P3+P4 | Move P6 to Tile 7 | | | | |
| Tile 7 | | | | | [P5,P6 Available] | P7=P5+P6 | Move P7 to Tile 8 | | |
| Tile 8 | | | | | | | [P7 Available] | Y=F(P7) | Store Y |

FIG. 8C

ALLOCATING COMPUTATIONS OF A MACHINE LEARNING NETWORK IN A MACHINE LEARNING ACCELERATOR

RELATED APPLICATION

This application is a continuation of U.S. patent application Ser. No. 16/862,515, "Allocating Computations of a Machine Learning Network in a Machine Learning Accelerator," filed Apr. 29, 2020. The subject matter of all of the foregoing is incorporated herein by reference in their entirety.

BACKGROUND

1. Technical Field

This disclosure relates, in general, to the implementation of machine learning networks on hardware.

2. Description of Related Art

Machine learning is one of the most powerful recent trends in technology. In machine learning, a model is developed to perform a certain task. The model, which will be referred to as a machine learning network, is trained and deployed in order to carry out that task. For example, a model may be developed to recognize the presence of objects within images captured by a set of cameras. Once the model is deployed, images captured by the cameras are input to the machine learning network, which then outputs whether (or to what confidence level) objects are present within the images.

Machine learning networks typically require the handling of a large volume of data and the execution of a large number of computations. As a result, they are commonly implemented in compute facilities with access to significant resources, such as in the cloud or on server clusters. However, the sources of input to machine learning networks may be located remotely from these compute facilities. For example, cameras and other types of sensors may be located on the edge of the network. Example applications for edge devices include automotive and other forms of transportation including autonomous transportation, agricultural, industrial, robotics, drones, surveillance and security, smart environments including smart cities, medical, and personalized health. Example tasks include computer vision, image analysis, image understanding, speech recognition, audio analysis, audio understanding, natural language processing, classification and pattern recognition tasks. For edge devices, it may be desirable to perform certain tasks in real-time. In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. Thus, one common paradigm is for the input sources to be web-based so that they can continuously send their captured data to the cloud-based compute facility, which then executes the machine learning network and returns the result.

However, there can be many advantages if the machine learning network and computing elements on which it executes was instead embedded on edge devices, such as combined with the camera system.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 8A illustrates implementation of an MLN subnet utilizing a low number of Tiles.

FIG. 8B illustrates implementation of an MLN subnet with low latency.

FIG. 8C illustrates implementation of an MLN subnet with high throughput.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A compiler receives a description of a machine learning network and generates a computer program that implements the machine learning network. The compiler allocates instructions of the computer program to different groups of processing elements (Tiles) for execution. For example, different groups of Tiles may implement different layers of the machine learning network, or in some cases, a single Tile may implement multiple layers of the machine learning network. The compiler may determine the size of the different groups based on a partial computation metric associated with the computations performed to implement the corresponding layer. For example, the compiler may size the different groups such that the processing times for each group to implement computations of a respective layer on an input sample are substantially similar (e.g., within a threshold time). Furthermore, the compiler may assign specific Tiles to each group based on a set of predefined layout constraints. The compiler may statically schedule at least a portion of the instructions into one or more deterministic phases for execution by the groups of Tiles.

Figure 1A:
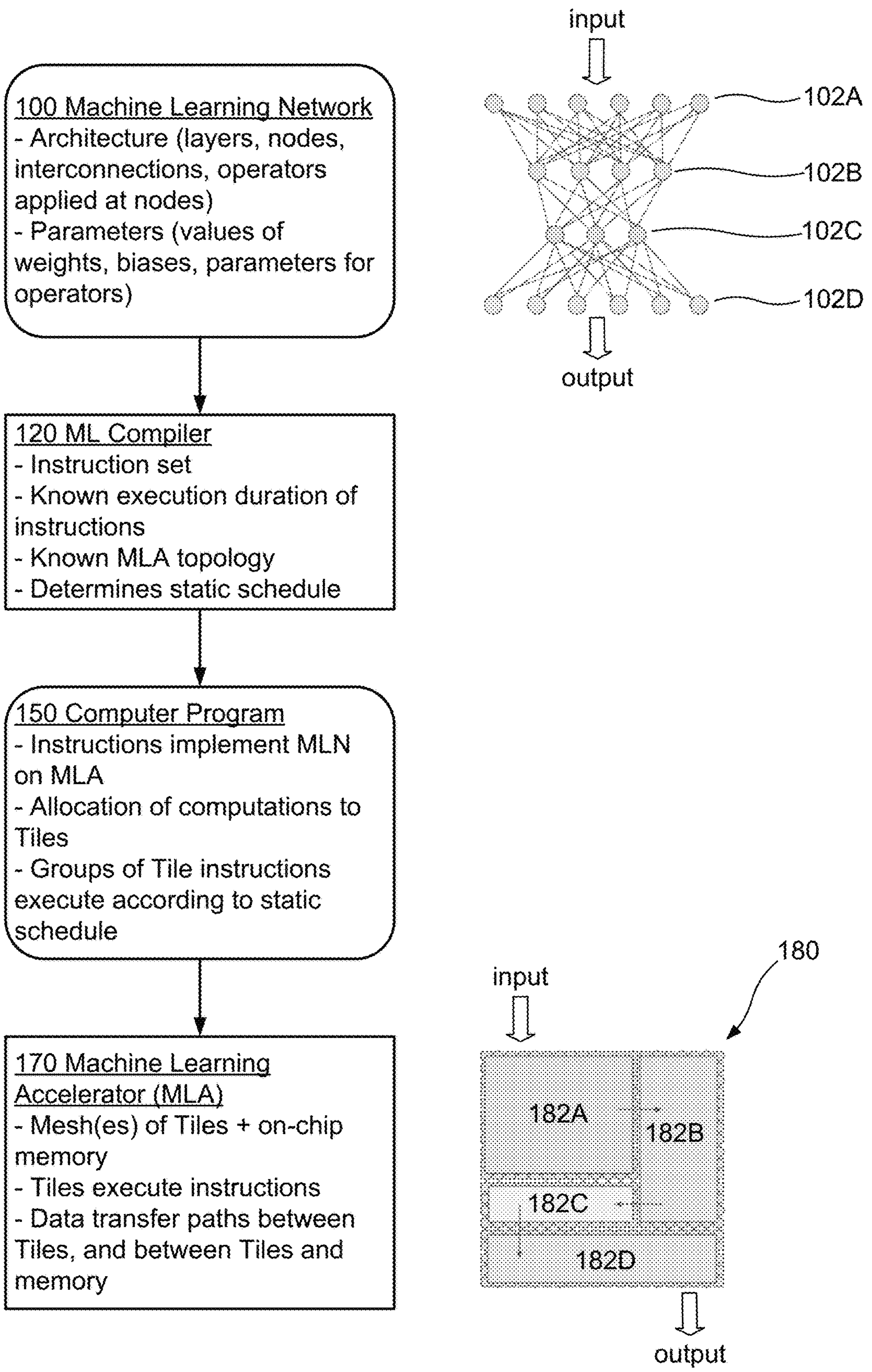
FIG. 1A is a block diagram of a system with a machine learning accelerator (MLA) and corresponding compiler, according to the invention.

FIG. 1A is a block diagram of one example of a system with a machine learning accelerator (MLA) 170 and corresponding compiler 120, according to the invention. The compiler 120 receives a description of a machine learning network 100 and generates a computer program 150 that implements the machine learning network using MLA 170. The computer program 150 includes instructions that are executed by processing elements (Tiles) in the MLA according to a schedule determined by the compiler. For convenience, these will be referred to as statically scheduled instructions. The instructions executed by the Tiles (Tile instructions) are statically scheduled because the compiler can determine which instructions are executed by which Tiles at what times, as will be explained in greater detail below. For example, for the statically scheduled instructions, there are no conditions, branching or data dependencies that can be resolved only at run-time, and which would affect the timing and order of the execution of the instructions. Note that the static schedule determined by the compiler may or may not be included as part of the instructions and computer program. In some embodiments, the computer program may expressly include the schedule, specifying that instruction A is executed at cycle X, instruction B is executed at cycle X+4, instruction C is executed at cycle X+12, etc. In alternate embodiments, the computer program may specify only that instruction A is executed, followed by instruction B, and then instruction C, but without any scheduling information. Even though the static schedule is not expressly specified, these instructions will still execute according to the schedule determined by the compiler because the compiler knows how long it takes to execute each instruction. As a result of the static scheduling, the MLA and instruction set for the MLA may be simplified, with the complexity offloaded to the compiler. A simpler MLA can result in lower cost, lower power consumption and higher performance, all of which are desirable for implementation in edge devices.

In more detail, the MLN 100 may be described by an architecture and parameters. A depiction of an MLN is shown to the right of box 100 in FIG. 1A. Most MLNs include multiple layers 102, each with one or more nodes which are represented by circles in FIG. 1A. The lines between nodes in FIG. 1A represent interconnections between the nodes (and layers). Each node calculates a weighted sum of the values received from its connected nodes, possibly also applying a bias. Examples are matrix multiplication and convolution. Each node may also apply certain functionality (operators), such as nonlinear functions (e.g., tanh function), softmax operator, etc. A typical node may compute an output:

$$y = F\left(\sum w_i x_i + b\right) \quad (1)$$

where $x_i$ are the inputs received from other nodes i, $w_i$ are weights, b is a bias and F( ) is a nonlinear operator. The MLN architecture includes the number of nodes (and layers) and their interconnectivity, and the operators applied at nodes. The operators may be described in a parameterized form. The MLN parameters include the weights, biases, and parameters for the operators.

MLNs may vary in size, depending on the desired task. Small MLNs may have 5-10 or fewer layers, medium size MLNs may have 30-50 layers, and large MLNs may have 100 or more layers. Examples of inputs include text, images and video. Some of the layers may be fully interconnected (i.e., every node in one layer provides input to every node in the next layer), and others may be more locally interconnected (e.g., to implement convolutions). Each weighted interconnect represents a scalar multiplication. The total number of scalar multiplications required to implement an MLN may be on the order of millions, billions, tens of billions or even more. These may be carried out by matrix multiplications.

The MLA 170 includes a plurality of Tiles 180 and an on-chip memory system implemented on a semiconductor die. The Tiles are organized into one or more meshes of interconnected Tiles. A depiction of a Tile mesh is shown to the right of box 170 in FIG. 1A. In each mesh, the Tiles 180 are organized in a regular pattern and the interconnections within each mesh provide data transfer paths between Tiles in the mesh. The Tiles execute computations according to instructions received by the Tiles and using data stored in the on-chip memory system. These instructions may be for computations and/or for data transfer. Computations include multiply (including matrix multiply), add, and operators (e.g., nonlinear functions, lookup table, min/max, pooling). These are computations that implement the MLN. In the example of FIG. 1A, the computations performed by layers 102A-D are allocated to groups 182A-D of Tiles as indicated. The allocation is not required to be 1:1. For example, multiple layers could be allocated to a single Tile or vice versa. Not every computation required to implement an MLN need be executed by a Tile; some computation may be executed outside the MLA (e.g., floating point operations, if the Tiles only do integer arithmetic). Tiles typically will at least perform matrix multiplication.

The compiler 120 receives a description of the MLN 100 and generates a computer program 150 that implements the MLN using the MLA 170. The computer program 150 receives an input sample for the MLN and executes the operations of the MLN to produce the output for the MLN. The computer program 150 includes instructions to be executed by the Tiles for implementing computations in the MLN and may also include instructions to be executed by other elements, such as a controller outside the Tiles.

Figure 1B:
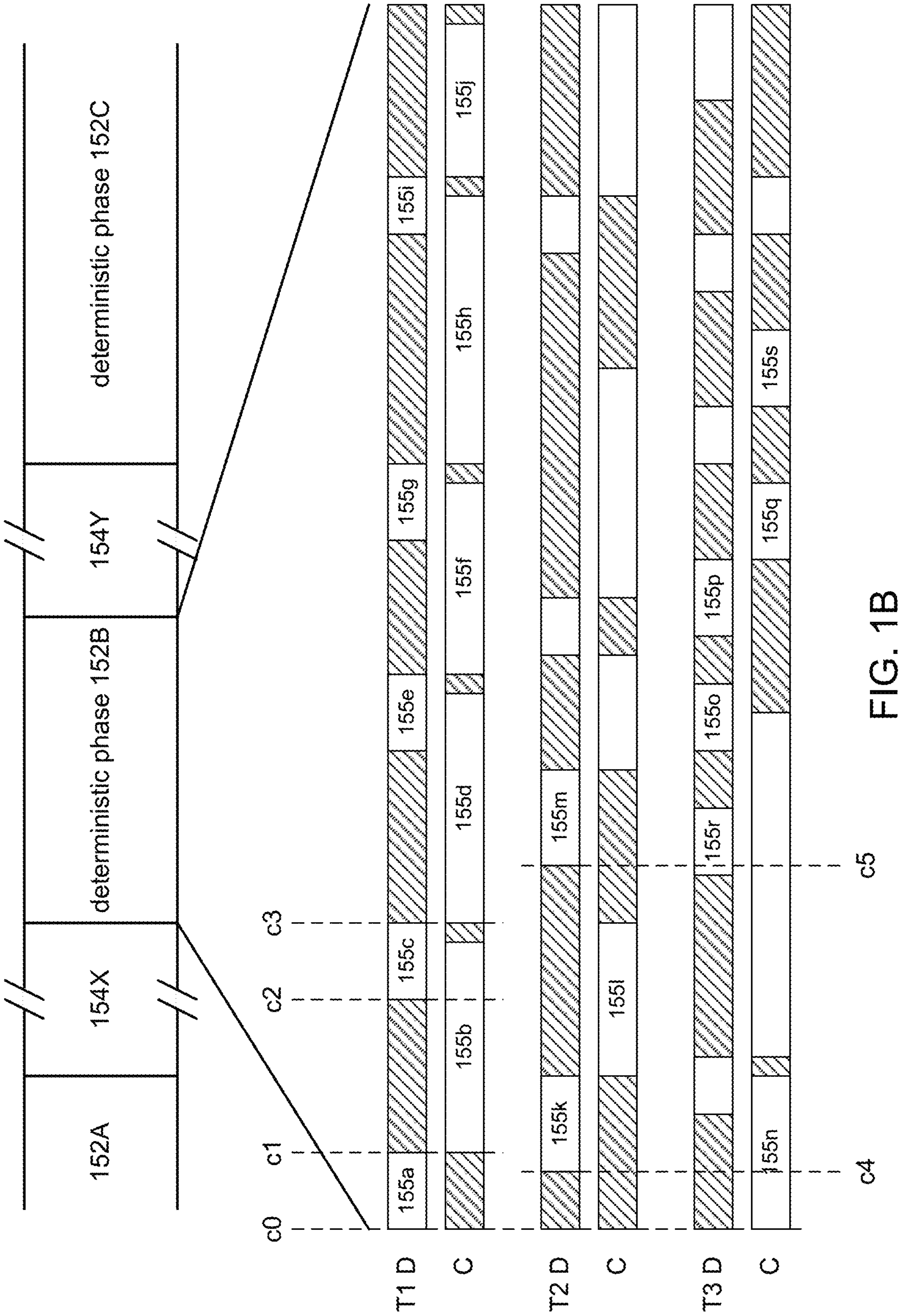
FIG. 1B illustrates partitioning a computer program into deterministic and non-deterministic phases.

As shown in FIG. 1B, the compiler partitions the Tile instructions into one or more deterministic phases 152A,B,C which typically utilize multiple Tiles. The instructions in a deterministic phase 152 may be statically scheduled by the compiler. For example, a deterministic phase 152 may include a series of computations required to implement a portion of the MLN, where the time required for each computation and associated data transfers is known. As a result, the compiler may statically schedule the Tile instructions within that deterministic phase relative to the other Tile instructions in the phase. The resulting computer program produced by the compiler then implements an allocation of instructions to Tiles and a schedule for executing the instructions as determined by the compiler, although these may not be expressly contained within the computer program. In the example of FIG. 1A, the computations performed by layers 102A-D are allocated to groups 182A-D of Tiles as indicated. In addition, all of the Tile instructions (including both for computation and for data transfer) are executed in a single deterministic phase.

The computer program may also include non-deterministic phases 154X,Y. For example, non-deterministic phases 154 may include data fetch or instruction fetch from off-chip memory where the time required to execute the operation varies too much to allow reliable synchronization with other operations. Other examples include computations that occur off-chip, and conditions, branching and other programmatic constructs that depend on values not known until run-time. The breaks in the rectangles for the non-deterministic phases 154 indicate that the timing is not deterministic, whereas the deterministic phases 152 are represented by rectangles without breaks. In FIG. 1B, the deterministic and non-deterministic phases are shown as alternating. This is not required. For example, deterministic and non-deterministic phases may execute concurrently.

FIG. 1B also shows more detail of deterministic phase 152B, which shows the static schedule computed by the compiler for executing Tile instructions in this phase. The phase 152B begins at some time when all of the Tiles are synchronized, which for convenience is marked as cycle c0 in FIG. 1B. The Tiles may have circuitry that synchronizes the Tiles. For example, each Tile may monitor when it is ready to begin execution of a deterministic phase 152B and then actual execution begins when all Tiles signal that they are ready. Alternatively, an external controller may synchronize the Tiles and start the deterministic phase 152B when all Tiles are ready.

In this example, the instructions are executed by three Tiles, as denoted by T1, T2 and T3. Each Tile has two pipelines: a "D" pipeline for executing data transfer instructions and a "C" pipeline for executing compute instructions. The row labeled T1 D shows instructions executed by the Tile 1 D (data transfer) pipeline, and the row labeled T1 C shows instructions executed by the Tile 1 C (compute) pipeline. For this example, assume that all the data transfer instructions are instructions that load new data into that Tile for consumption by the compute pipeline. The white regions of each row denote the execution of instructions and the hashed regions indicate that the pipeline is idling or executing a NO-OP (no operation).

For Tile 1, instruction 155*a* transfers data into Tile 1 and instruction 155*b* then performs a computation that consumes that data. Instruction 155*b* is dependent on instruction 155*a*. Here, the T1 C pipeline is not required to continuously poll the T1 D pipeline at run-time for when the data is available, and run-time message passing between the pipelines is not required to indicate that the data is available. Rather, because the duration (i.e., time required to execute) of instruction 155*a* is known, the compiler knows when the data will be available (for convenience, marked as cycle c1 in the figure) and can construct a static schedule in which instruction 155*b* starts execution then. The duration of instruction 155*b* is also known, so the compiler knows that compute instruction 155*d* may start after instruction 155*b*. In this case, the compiler determines a static schedule in which instruction 155*d* starts at cycle c3. Compute instruction 155*d* depends on data brought into the Tile by instruction 155*c*. The duration of instruction 155*c* is known, so the compiler knows that in the static schedule, instruction 155*c* must start at cycle c2 or earlier. This pattern is repeated for pairs of data transfer instructions and compute instructions 155*e-f*, 155*g-h*, 155*i-j*.

For Tile 2, compute instruction 155*l* depends on data from data transfer instruction 155*k*. However, instruction 155*k* does not start immediately at cycle c0. Rather, it has a delayed start at cycle c4. This may be because the data transfer path required by instruction 155*k* is occupied by some other data transfer instruction and is not available until cycle c4. The start time of instruction 155*k* in the static schedule is not determined by run-time arbitration or contention mechanisms for the shared data transfer path. Rather, the compiler knows that the data transfer path is occupied since the compiler knows the start times and durations of all the instructions, so the compiler simply creates a static schedule in which instruction 155*k* does not start until cycle c4 when the compiler knows the data transfer path will be available. Similarly, data transfer instruction 155*m* has a delayed start time. Perhaps the T2 D pipeline is being used to transfer out the results of computation 155*l* and does not become available until cycle c5.

For Tile 3, computation 155*n* starts immediately at cycle c0. Perhaps the required data was loaded into Tile 3 during some prior phase. Data transfer instructions 155*o* and 155*p* load data for compute instruction 155*q*. They are separated in time, perhaps because different pieces of data were not available or the data transfer paths were not available until those times. As a final example, data transfer instruction 155*r* loads data for compute instruction 155*s*. In the static schedule, the compiler places instruction 155*r* well in advance of when the data is required, but this may be because that is when the data transfer path is available or perhaps the data was transferred out of the sourcing Tile in order to make room in that Tile.

Execution of the instructions according to the static schedule at run-time may be implemented in different ways. In one approach, the computer program includes an express schedule for the execution of the instructions. Continuing the example of FIG. 1B, the computer program may specify that instruction 155*a* executes at cycle c0, instruction 155*b* at cycle c1, instruction 155*c* at cycle c2, etc. Alternatively, the compiler may fill each instruction stream with NO-OPs to achieve the correct timing. A NO-OP (no operation) is an instruction that occupies a certain number of cycles without other activity. For example, the compiler knows that instruction 155*a* will end at cycle c1 and instruction 155*b* is supposed to begin at cycle c1. It may fill the space between cycles c0 and c1 with NO-OPs for the T1 C pipeline. The T1 C pipeline then just continuously executes instructions from its queue, and the NO-OPs ensure that instruction 155*b* is executed according to the compiler's static schedule. In yet another approach, the static schedule may be implemented by hardware. The T1 C pipeline may just stall on the execution of instruction 155*b* until the data from instruction 155*a* is ready. The compiler knows that data will be ready at cycle c1 and, therefore, instruction 155*b* will execute starting at cycle c1 even though the Tiles are unaware of the static schedule. Regardless of the implementation, for convenience, all of these situations will be described using the phrase "static schedule." Thus, a statement that the compiler statically schedules the instructions is intended to include all of the above implementations and is not meant to imply that the computer program expressly includes a scheduled time for each instruction.

In order to statically schedule the instructions in a deterministic phase, the compiler typically will know the duration of each instruction (i.e., how long each instruction takes to execute), the capabilities of each Tile (which Tiles can execute which instructions), the topology of data transfer paths to and from Tiles (including between Tiles, and between Tiles and on-chip memory), and the computations required and their dependencies (i.e., the MLN description). With this information, the compiler can schedule unconditional start times for the Tile instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or to check for or resolve contentions and collisions on shared data transfer paths at run-time may be avoided. The need for routing tables and other circuitry to determine routing at run-time may also be avoided. FIGS. 8 and 9 provide further examples of how the compiler converts a description of an MLN to a deterministic phase of statically scheduled instructions executed by the Tiles.

Other aspects include components, devices, systems, improvements, methods, processes, applications, computer readable mediums, and other technologies related to any of the above.

Figure 2A:
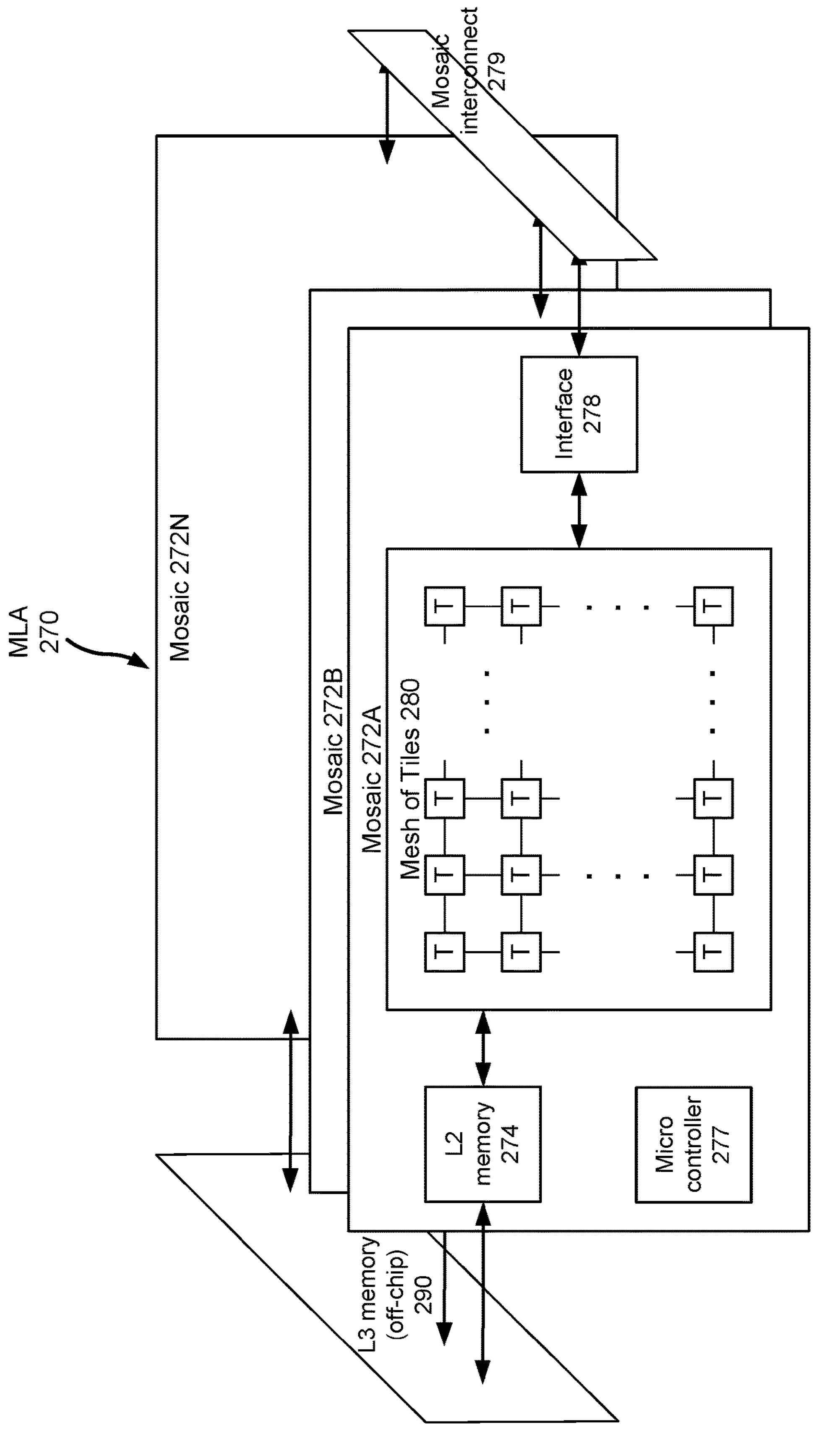
FIG. 2A is a block diagram of a hardware system, including an MLA.
Figure 2B:
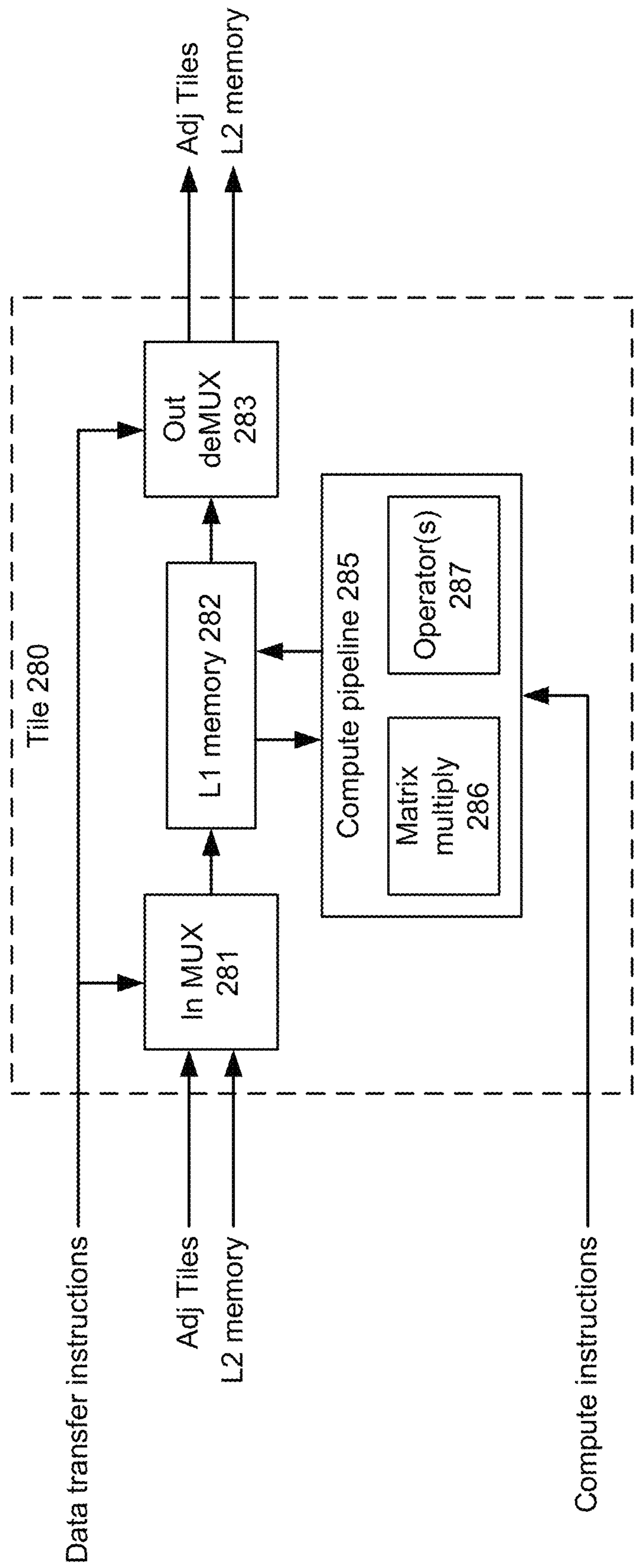
FIG. 2B is a block diagram of a Tile within an MLA.
Figure 3:
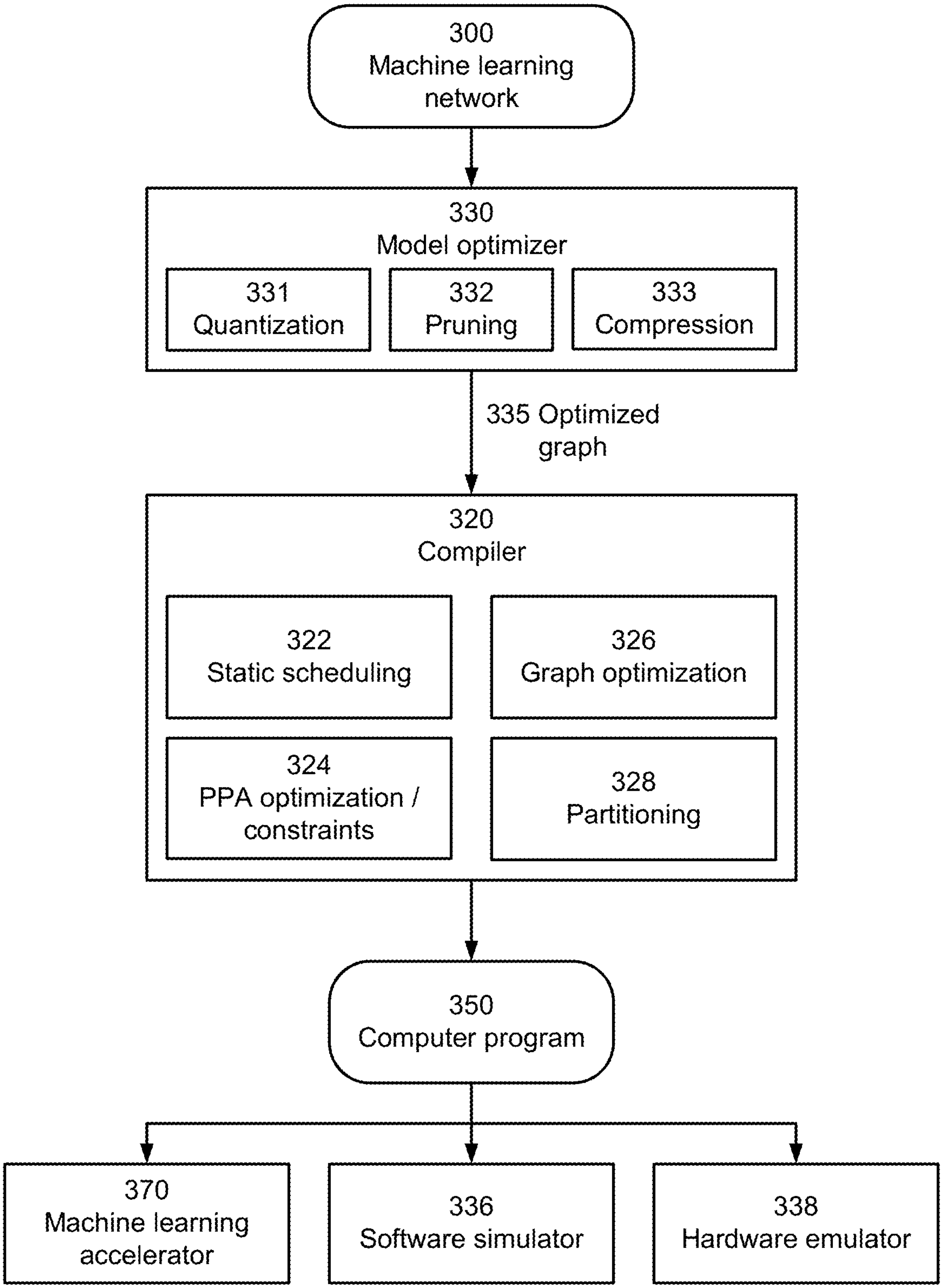
FIG. 3 is a block diagram of a software development environment, including an ML compiler.

FIGS. 2-3 are more detailed descriptions of an example system that includes an MLA and corresponding compiler. FIG. 2 shows the hardware component and FIG. 3 shows the software development environment.

FIG. 2A is a block diagram of a hardware system including an MLA 270. The MLA 270 includes all the components shown in FIG. 2A, except the off-chip L3 memory 290. The MLA components are implemented on a single die as part of a single chip. The MLA 270 includes one or more mosaics 272A-N. In this example, all of the mosaics are the same. Each mosaic 272 includes a mesh of Tiles 280, an on-chip memory system and a controller 277. In FIG. 2A, the on-chip memory system is a multi-level memory system, which includes a level 1 (L1) memory distributed among the Tiles (see FIG. 2B) and a level 2 (L2) memory 274 shared by the Tiles. If there are multiple mosaics 272, the MLA 270 may include a dedicated interconnect 279 for connecting the different mosaics. Each mosaic also includes an interface 278 to the interconnect 279.

FIG. 2B is a block diagram of a Tile 280 within the MLA. In this example, all the Tiles are the same. Each Tile 280 includes an L1 memory 282. Each Tile 280 also includes a data transfer pipeline that executes instructions for transferring data to and from the L1 memory 282. Here, the Tiles 280 are arranged in a rectangular array as shown in FIG. 2A, with each Tile connected to its adjacent neighbors. Interior Tiles are connected to four adjacent Tiles. Edge Tiles are connected to adjacent Tiles and also to L2 memory 274. In FIG. 2B, the L1 memory 282 may receive data from any of its adjacent Tiles and/or from L2 memory if it is an edge Tile. Similarly, it may transfer data to any of its adjacent Tiles and/or to L2 memory if it is an edge Tile. The data transfer operations are controlled by data transfer instructions received and executed by the Tiles.

Each Tile 280 also includes a compute pipeline 285 for executing computations using data stored in the L1 memory 282. The L1 memory acts as software-configurable registers for the compute pipeline 285. The compute pipeline 285 includes matrix multiplication circuitry 286, such as a systolic array, and circuitry for implementing different types of operators 287. The computations are controlled by compute instructions received and executed by the Tiles.

In this particular example, all of the data transfer instructions and compute instructions executed by the Tiles are statically scheduled. These instructions include data transfer between L1 memories in different Tiles, and data transfer between L1 memory and L2 memory. Data transfer instructions may specify one hop at a time (e.g., transfer data to the east neighbor Tile) or may specify destination and path through intermediate Tiles (e.g., transfer data to Tile (5,5) using path east-east-north-north-east). The instructions also include matrix multiplies performed by the Tiles and operators applied by the Tiles. These operations do not require very many different instructions to implement, so the overall instruction set may be fairly small, for example not more than 20 instructions, or not more than 50 instructions.

The L3 memory 290 is off-chip. In this example, the L1 and L2 memories are implemented as on-chip SRAM and the L3 memory is implemented as DRAM (flash memory and SSD drives are other alternatives). Because the L1 and L2 memories are implemented as SRAM, the data transfers between L1 memories or between L1 and L2 memories have deterministic timing, so these data transfer instructions can be statically scheduled by the compiler. However, data transfer from off-chip DRAM is more unpredictable in timing. As a result, these instructions are non-deterministic in nature and they are executed by the microcontroller 277. Therefore, they are executed in one of the non-deterministic phases and they are not statically scheduled.

In one approach, the instructions in the computer program and the data required for computation (e.g., input, weights, biases, parameters for operators) are initially loaded into L3 memory 280. From time to time, instructions and associated data are transferred from L3 memory into L1/L2 memory during a non-deterministic phase since the timing of data transfers from DRAM is not deterministic. Once these instructions and data are loaded into L1/L2 memory, the computer program enters a corresponding deterministic phase in which the Tiles execute the loaded instructions according to a static schedule. The non-deterministic and deterministic phases may occur concurrently. For example, data may be continuously streamed into the L1/L2 memory during the non-deterministic phase, with the corresponding statically scheduled instructions from the deterministic phase consuming that data. In one approach, the Tiles execute only statically scheduled instructions, and all non-statically scheduled instructions are executed by processing elements outside the Tile mesh, for example, the microcontroller 277.

SRAM has predictable timing so implementing the L1 and L2 memories as SRAM allows the compiler to statically schedule data transfers from those memories into the Tiles for computation. However, there is a limit to the amount of SRAM that may be implemented on a die. In order to increase the effective size of SRAM, a virtual SRAM approach may be used. In one approach, the compute instructions that consume certain data are not fetched into the Tiles until after the corresponding data have been transferred from DRAM (L3 memory) to SRAM (L1/L2 memory). This guarantees that the compute instructions will not be executed by the Tiles before the data is available. All data effectively will appear as if it is transferred to the Tiles from SRAM for computation, even if all of the data would not fit into the available SRAM.

L2 memory may also be used to temporarily store interim values that are too voluminous to store in L1 memory. For example, a layer K of the MLN may produce a large amount of data at its output, to be used as input to the next layer K+1. The layer K output may be stored in L2 memory and then retrieved from L2 memory as needed for the next layer's computations. This may be implemented using a ping pong buffer approach when multiple input samples are processed as a pipeline. The L2 memory is divided into two regions A and B. When a first input sample is processed, the layer K output is stored in region A of the L2 memory. The computations for layer K+1 retrieve the stored values from region A. At the same time, the second input sample is processed and the layer K output is stored in region B of the L2 memory. The two regions then alternate, with the Tiles implementing layer K storing to one region while the Tiles implementing layer K+1 read from the other region. The synchronization is implemented by the static scheduling. The compiler knows when regions A/B will be ready and the instructions to implement layer K+1 will execute after that time. No synchronization primitives are needed.

The approach based on static scheduling described above is not restricted to the examples described above. For example, different network topologies of Tiles may be used. Other Tile meshes may also be statically scheduled, so long as the time required to execute computations and to transfer data between Tiles is deterministic and may be determined at compile time. Additional examples are described in U.S. application Ser. No. 16/840,216, "Machine Learning Network Implemented by Statically Scheduled Instructions, with Compiler," which is incorporated by reference herein in its entirety.

FIG. 3 is a block diagram of a software development environment including an ML compiler 320. In this example, the software development environment also includes a model optimizer 330. The model optimizer 330 receives a description of the MLN 300 and produces an optimized graph 335 of the MLN. It may apply optimizations such as quantization 331, pruning 332 and/or compression 333. Quantization 331 reduces the resolution of calculated values. For example, floating point values may be quantized to a certain number of bits and then integer math used instead of floating point math. This reduces the complexity and power consumed by the Tiles. Pruning 332 removes parts of the MLN that do not contribute significantly to the overall results. For example, if certain weights are zero or close to zero, those weighted interconnects may be pruned. Finally, because MLNs contain a large amount of data, compression may be used successfully to reduce data transfer bandwidths.

The resulting optimized description 335 of the MLN may be expressed as a graph, in which the nodes of the graph represent nodes in the MLN and the edges of the graph represent the weighted interconnects. The compiler 320 receives the optimized graph 335 and produces the resulting computer program 350. The compiler 320 may perform operations including static scheduling 322, PPA (power performance area) optimizations 324, graph optimizations 326 and/or partitioning 328. Static scheduling 322 of the appropriate instructions was described above.

PPA optimization 324 includes different optimizations of the computer program 350. For example, the allocation of MLN computations to Tiles may be optimized to reduce power consumption, to increase performance (such as reducing latency or increasing throughput) and/or to reduce area (e.g., number of Tiles used). Examples of this are described in FIGS. 4-8.

For a given graph representation of an MLN, the number of computations required to execute the MLN is fixed. As a result, in one approach, the compiler may optimize to increase the utilization of compute resources in the Tiles—to keep the compute pipelines as busy as possible. However, for a Tile to execute a computation, the data for that computation must be available. This means that any prior computations must be completed and that those results must be transferred to the Tile doing the next computation. Thus, rather than focusing on computations, the compiler may optimize with respect to data transfer to reduce the wait times of computations. It may also allocate computations to Tiles in order to reduce data transfers between Tiles in the same mesh, to reduce data transfers from outside the MLA and/or to reduce data transfers that cross the boundary of the mesh (e.g., reducing data transfers between L1 and L2 memory and trying to keep all data in L1 memory).

The compiler 320 may also optimize 324 the computer program 350, subject to constraints on power, performance, area and/or any of the quantities described above. Graph optimization 326 includes analysis of the graph representing the MLN to prune, merge or quantize links, parameters, values, and layers to achieve better performance. Partitioning 328 concerns mapping the computations in the MLN to an implementation on the MLA. This includes determining which computations are allocated to which Tiles and how data flows through the mesh of Tiles during computation. If there are multiple mosaics, it also includes determining which computations are allocated to which mosaics.

The resulting computer program 350 may be loaded into memory for execution on a machine learning accelerator 370. For example, one possible application is object detection. In this case, the inputs are images captured by a video camera. The MLN 300 has been trained to identify certain objects in the video images. The computer program 350 implementing the MLN is loaded onto memory that is accessible by the MLA 370, which is implemented as a chip inside the camera. This way, images captured by the video camera may be immediately analyzed by the computer program 350 running on the MLA 370.

In addition to the MLA 370, the computer program 350 or parts of it may be run on a software simulator 336 and/or hardware emulator 338 (including FPGAs configured as MLAs). These may be used for product development, debugging and/or prototyping. For some purposes, a full simulation or emulation is not necessary. For example, to check that there are no collisions or conflicts between statically scheduled instructions, only the flow of data may be simulated or emulated. It is not necessary to compute actual values.

Figure 4:
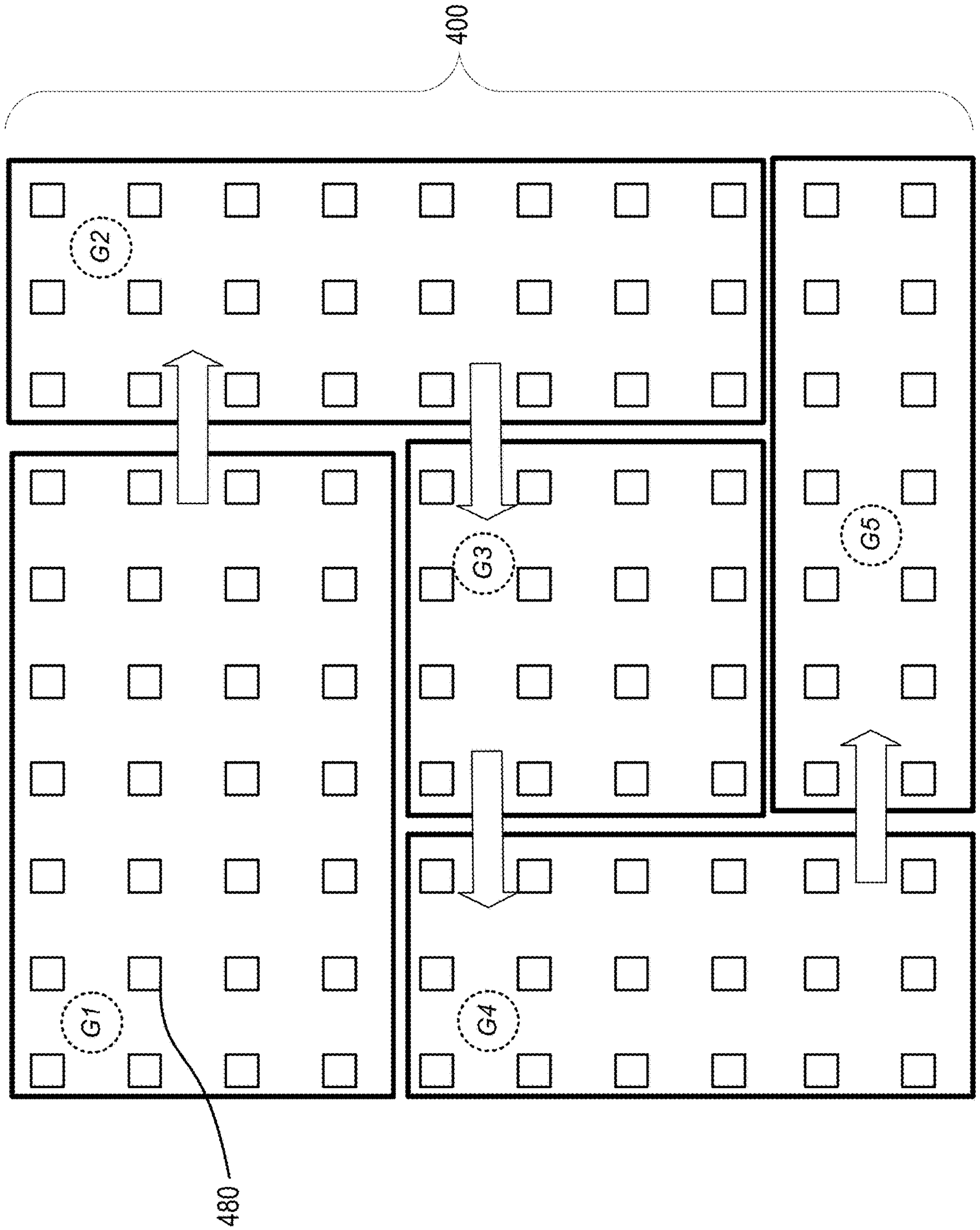
FIG. 4 is a diagram illustrating an example of an allocation of instructions for implementing an MLN into groups of Tiles.

FIG. 4 illustrates an example embodiment of a technique for allocating groups of Tiles 480 for implementing computations of an MLN. In the illustrated embodiment, the compiler 120 allocates one group of Tiles Gi for each layer i of the MLN. A group of Tiles can be multiple Tiles, a single Tile. In the case that multiple layers are implemented in whole or in part on a single Tile, the group of Tiles Gi for a layer i that uses only a fraction of the available resources of a Tile may be represented as a fractional value (e.g., Gi=0.5 indicates that a layer i is implemented using 50% of the available resources of a Tile). In the example of FIG. 4, an MLN has five layers and the compiler 120 allocates five groups of Tiles with each group Gi corresponding to one of the layers i of the MLN. In other allocations, there is not necessarily a one-to-one correspondence between the number of groups and number of layers in the MLN. For example, in some cases, there may be a greater number of layers than groups. Here, a single group Gi may perform computations associated with a set of adjacent layers of the MLN. For example, an MLN with fifteen layers may be allocated between five groups of Tiles in which the first group of Tiles G1 may perform computations associated with layers 1, 2, and 3; the second group of Tiles G2 may perform computations associated with layers 4, 5, and 6; the third group of Tiles G3 may perform computations associated with layers 7, 8, and 9; and so on. In another allocation scheme, layers may be allocated to groups of Tiles in a circular manner. For example, the first group of Tiles G1 may perform computations associated with layers 1, 6, and 11; the second group of Tiles G2 may perform computations associated with layers 2, 7, and 12; the third group of Tiles G3 may perform computations associated with layers 3, 8, and 13; and so on. In yet further embodiments, there may be a greater number of groups than layers. In this case, layers may be sub-divided into sub-layers with each sub-layer allocated to one group of Tiles.

The specific Tiles in each group may be assigned based on a set of predefined constraints and/or one or more optimization criterion. In an embodiment, as illustrated in the example of FIG. 4, each group of Tiles G may comprise a contiguous block such that each Tile 480 in the group Gi is physically adjacent to at least one other Tile 480 in the group Gi. The groups G may be limited to blocks of specific shapes (e.g., rectangles or squares) or the shape of the blocks may be unconstrained and may comprise arbitrary shapes. In other configurations, the compiler 120 does not necessarily constrain the groups of Tiles G to contiguous blocks and a single group G may instead include two or more discontinuous subsets of Tiles 480. In an embodiment, a group of Tiles may be constrained to Tiles on a single Mosaic. Alternatively, the Tiles in a group may span multiple Mosaics.

The groups of Tiles G may operate in a pipelined manner. Here, during each time period t, a new input sample is inputted to the first group of Tiles G1 implementing the first layer of the MLN and a new output sample is outputted from the last group of Tiles $G_N$ (where N is the number of groups) implementing the last layer of the MLN. The groups of Tiles implementing the intermediate layers of the MLN each perform computations on the outputs from the group of Tiles implementing the previous layer in the MLN and generate outputs to the groups of Tiles implementing the subsequent layer of the MLN. Thus, at any given time period, the MLA 400 may perform processing associated with N different input samples in parallel, where N is the number of layers in the MLN.

Figure 5:
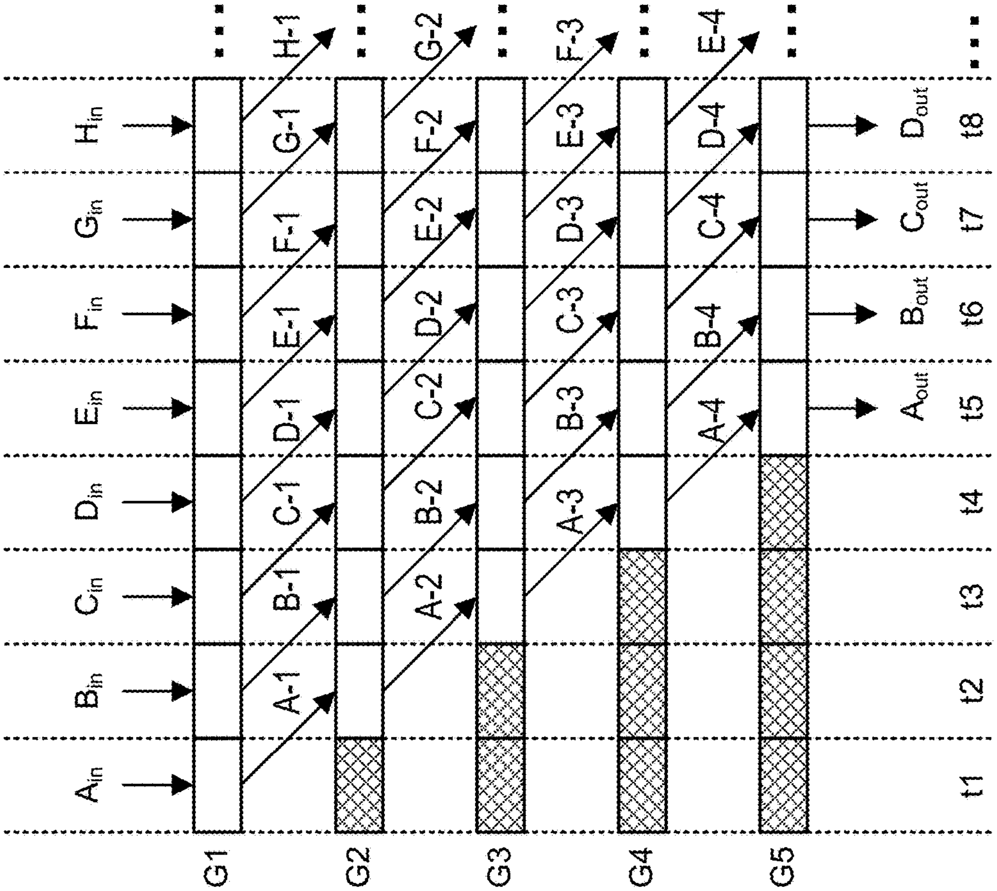
FIG. 5 is an example timing diagram for a pipelined implementation of an MLN based on an allocation of layers to groups of Tiles.

FIG. 5 illustrates an example of the pipelined processing. In this example, during a first time period t1, the first group of Tiles G1 implements the first layer of an MLN on a first input sample Ain to generate intermediate data A-1. During the second time period t2, the second group of Tiles G2 implements the second layer of the MLN on the intermediate data A-1 to generate intermediate data A-2, and the first group of Tiles G1 implements the first layer of the MLN on a second input sample Bin to generate intermediate data B-1. During the third time period t3, the third group of Tiles G3 implements the third layer of the MLN on the intermediate data A-2 to generate intermediate data A-4, the second group of Tiles G2 implements the second layer of the MLN on the intermediate data B-1 to generate intermediate data B-2, and the first group of Tiles G1 implements the first layer of the MLN on a third input sample Cin to generate intermediate data C-1. The pipeline may continue similarly for remaining groups of Tiles associated with the MLN. As can be seen, once the pipeline is filled, the last group of Tiles G5 generates new output samples (e.g., Aout, Bout, Cout, and so on) in each subsequent period.

In alternative embodiments, the time periods for implementing consecutive layers of an MLN on a particular input sample may overlap. For example, instead of a group of Tiles Gi completely processing a layer i of the MLN before the next group of Tiles Gi+1 begins processing the next layer i+1 of the MLN, the group of Tiles Gi+1 may instead begin processing some output data from previous group Gi prior to the group Gi completing of all of the processing associated with a given input data sample. For example, the group G4 may begin processing some of the data in intermediate output B-3 before the group G3 completes all operations associated with generating B-3.

While FIG. 5 illustrates a pipelined process for a simple machine learning network, other examples, may involve more complex topologies in which results from one layer may be passed to a layer that may be several layers beyond the immediately succeeding layer (e.g., a resnet-50 topology).

Figure 6:
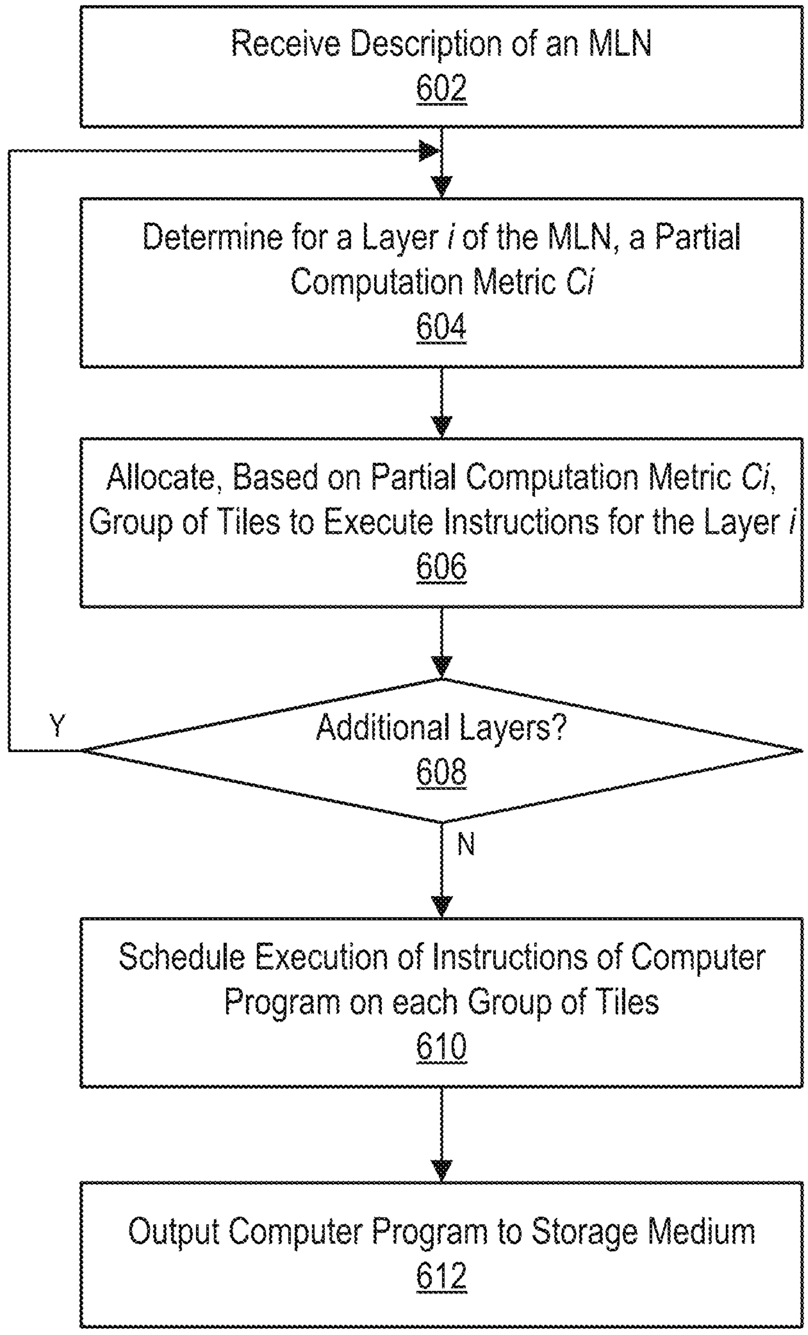
FIG. 6 is a flowchart illustrating an example embodiment of a process for generating a computer program for implementing an MLN using layer-based groupings of Tiles.

FIG. 6 illustrates an example embodiment of a process for generating a computer program for implementing an MLN using groups of Tiles. A compiler 120 receives 602 a description of an MLN. The compiler 120 determines 604, for a layer i of the MLN, a partial computation metric Ci for the layer i. In one embodiment, the partial computation metric Ci represents a measure of relative complexity of the computations associated with processing of the layer i relative to the other layers of the MLN. For example, in one embodiment, the partial computation metric Ci represents a number of matrix multiplications performed when implementing the layer i. In another embodiment, the partial computation metric Ci represents a total number of computation instructions executed when implementing the layer i. In yet another embodiment, the partial computation metric Ci represents a total number of computation and data transfer instructions executed when implementing the layer i. In yet another embodiment, the partial computation metric Ci represents a total number of instructions cycles associated with implementation of the layer i. In yet further embodiments, the partial computation metric Ci represents a total processing time associated with execution of the instructions implementing the layer i. In yet further embodiments, the computation metric Ci is computed to represent an estimated relative power consumed by execution of the instructions implementing the layer i. In yet further embodiments, the computation metric Ci represents a weighted combination of one or more of the above-described criteria.

The compiler 120 allocates 606 a group of Tiles Gi to execute the instructions implementing the layer i. For example, the compiler 120 may determine a size (e.g., number of Tiles, or fractional number if the layer i is implemented using resources of a Tile shared with one or more other layers) in the group Gi, and may determine which specific Tiles are assigned to the group Gi. In an embodiment, the number of Tiles in the group of Tiles Gi is determined based on the partial computation metric Ci. For example, a layer i having a larger partial computation metric Ci (representing a relatively higher complexity) may be allocated a relatively larger number of Tiles than a layer j having a smaller partial computation metric Cj (representing a relatively lower complexity). The compiler 120 may determine the size of the group of Tiles Gi based on a linear or non-linear function of the partial computation metric Ci.

In an embodiment, the allocation and manner of computing the partial computation metric may be performed to optimize for one more configurable optimization criteria. For example, the allocation may be performed to minimize total processing time by dividing the processing time evenly between each group so that the downtime for any particular group between completing its processing associated with a given input sample and receiving the next input sample from a group implementing the previous layer can be minimized or kept below a desired threshold (e.g., the processing time associated with a given input sample is approximately the same for each group. In another embodiment, the allocation may be performed to optimize for minimal power, fewest data transfers, fewest reads from external memory, or some combination of criteria and/or constraints. In An embodiment of a process for allocating 606 the group of Tiles Gi is described in further detail below with reference to FIG. 7.

The compiler 120 determines 608 if there are additional layers of the MLN for allocating to groups of Tiles. If there are additional layers for allocating, the process may loop to step 604 for the next layer i+1. Otherwise, if groups of Tiles have been allocated to all layers, the compiler 120 proceeds to schedule 610 execution of the instructions of the computer program implementing for each of the groups of Tiles. Here, scheduling may include partitioning the Tile instructions into one or more deterministic phases and statically scheduling the Tile instructions within each deterministic phase relative to other Tile instructions in the same deterministic phase as described above.

The compiler 120 then outputs 612 the computer program for implementation on the MLA. For example, the compiler may write the computer program to a non-volatile memory device from which the computer program can be loaded by a controller associated with the MLA at run-time.

In alternative embodiments, the steps of FIG. 6 may be performed in according to an iterative process. For example, instead of sequentially determining final allocations of Tiles into each group, the compiler 120 may first perform a preliminary allocation to determine an initial set of groups, and may then iteratively refine the allocation by modifying the initial allocation in subsequent iterations. Here, the refinements may be performed to iteratively optimize for any of the optimization criteria discussed above.

Figure 7:
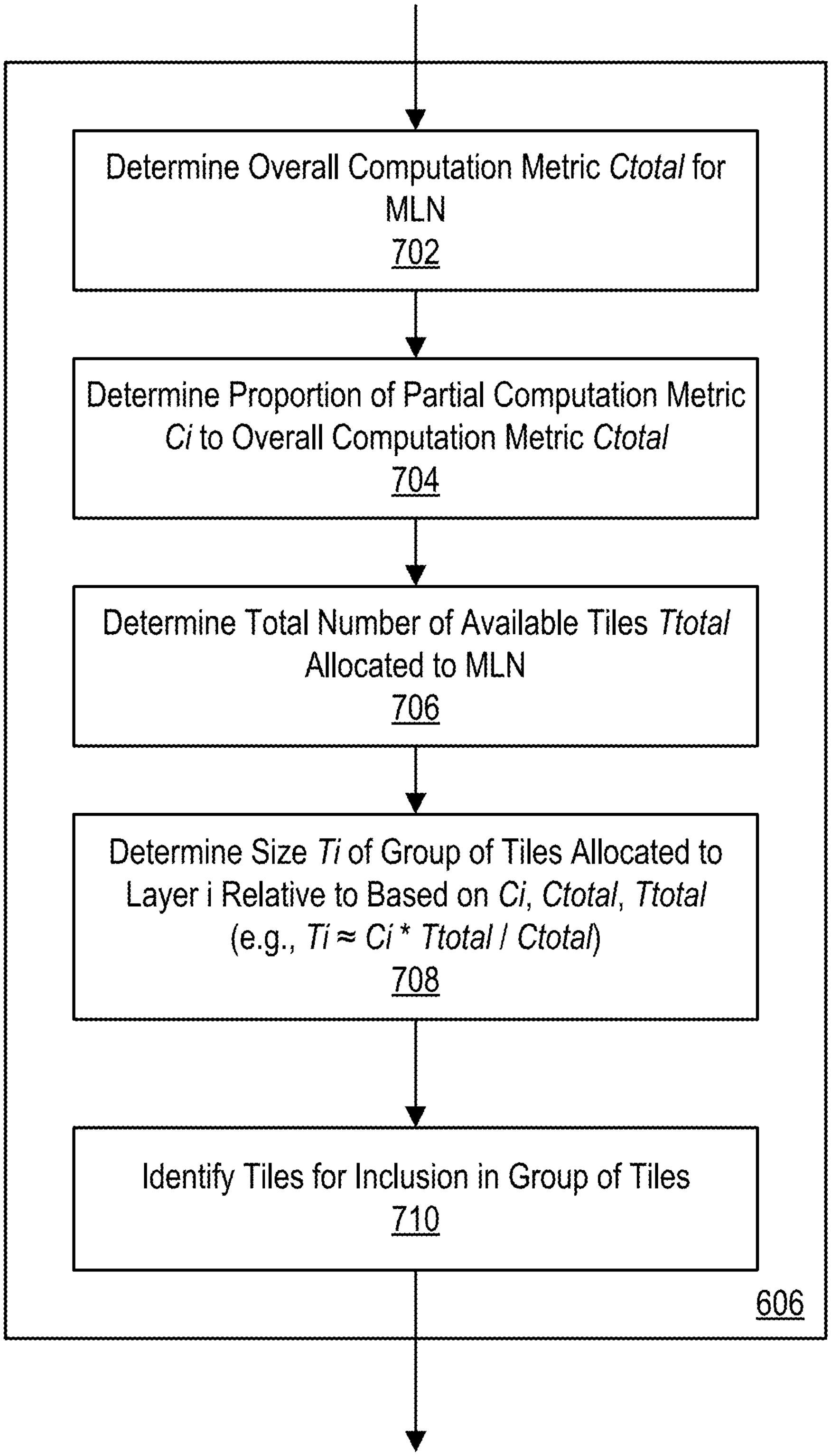
FIG. 7 is a flowchart illustrating an example embodiment of a process for allocating computations of a layer of an MLN to a group of Tiles.

FIG. 7 illustrates an example embodiment of a process for allocating 606 a group of Tiles Gi to execute the instructions implementing the layer i. The compiler 120 determines 702 an overall computation metric Ctotal for the MLN. For example, the overall computation metric Ctotal may represent a total number of matrix multiplications performed when implementing the MLN, a total number of computation instructions executed when implementing the MLN, a total number of computation and data transfer instructions executed when implementing the MLN, a total number of instructions cycles to implement the MLN, a total processing time for implementing the MLN, an estimated total power consumed by execution of the instructions implementing the MLN, or a combination thereof. The compiler 120 determines 704 a proportion of the partial computation metric Ci for the layer i relative to the overall computation metric Ctotal, e.g., Ci/Ctotal. The compiler furthermore determines a total number Ttotal of available Tiles for implementing the MLN. The total number of available Tiles may be manually assigned or may be determined automatically. For example, in one embodiment, the total number of available Tiles include all Tiles within a Mosaic. In another embodiment, the total number of available Tiles includes all Tiles in the MLA, which may span multiple Mosaics. In yet another embodiment, the total number of available Tiles includes all Tiles not otherwise assigned to a different MLN. In yet a further embodiment, the total number of available Tiles may be determined based on the overall computation metric Ctotal for the MLN. Here, an MLN having a higher overall computation metric Ctotal may be assigned a larger number of Tiles while an MLN having a smaller overall computation metric Ctotal may be assigned a smaller number of Tiles. In yet further embodiment, the total number of available Tiles may be based on configurable optimization criteria. For example, as described in further detail below with respect to FIGS. 8A-8C, a different number of Tiles may be made available depending on whether implementation will be optimized for number of Tiles, latency, throughput, or other criteria.

The compiler 120 determines 708 the size of the group of Tiles Gi for the layer i based on the partial computation metric Ci for the layer i, the total number of Tiles Ttotal allocated to the MLN, and the overall computation metric Ctotal for the MLN. For example, the size Ti of the group of Tiles Gi for the layer i may be determined as:

$$Ti = \text{round}\left(\frac{Ttotal \cdot Ci}{Ctotal}\right) \quad (2)$$

Here, the rounding function may comprise rounding to the nearest integer, rounding to the nearest multiple of two integers (when enforcing a constraint in which the groups comprise rectangular blocks), rounding to the nearest square (when enforcing a constraint in which the groups comprise square blocks), or a different rounding function. In another examples, the rounding function may comprise quantizing to a nearest fractional interval (e.g., 0.5, 0.25, 0.1, etc.) to account for cases where multiple layers are implemented on a single Tile. For example, if Ti=0.5, this indicates that the layer i can be implemented using half the available resources of a Tile (e.g., the Tile implements both a layer i and a layer j in which Ti=Tj=0.5)

The compiler 120 identifies 710 one or more specific Tiles for inclusion in the group of Tiles Gi having the size Ti. In an embodiment, the group of Tiles Gi is determined in a manner that enforces one or more predefined constraints. For example, the group of Tiles Gi may be constrained to contiguous blocks of predefined acceptable shapes such as rectangular blocks or square blocks. Furthermore, the blocks may be constrained based on minimum and/or maximum numbers of Tiles in the vertical or horizontal directions. In further embodiments, the compiler 120 may place constraints on the locations of the Tiles in a group of Tiles. For example, in an embodiment, the groups of Tiles are arranged such that blocks associated with adjacent layers of the MLN are arranged as adjacent blocks in the MLA. In other words, a group Gi (for $1<i<i_{max}$ where $i_{max}$ is the total number of layers) includes one or more Tiles adjacent to one or more Tiles in the group $G_{i-1}$ and includes one or more Tiles adjacent to one or more Tiles in the group $G_{i+1}$. Furthermore, a group $G_1$ implementing the first layer of the MLN and the group $G_{imax}$ implementing the last layer of the MLN may each be positioned adjacent to L2 memory. In an embodiment, these constraints may be achieved by laying out the groups G as blocks in a snake pattern as illustrated in the example of FIG. 4. In further embodiments, the specific Tiles for inclusion in each group may be selected to optimize some predefined optimization criteria. For example, the Tiles may be selected to minimize data transfer times between the groups. In an embodiment, the process for identifying 710 Tiles for inclusion in particular groups of Tiles may be performed iteratively to refine the groupings over multiple iterations according to a specified set of constraints and/or a specified set of optimization criteria.

FIGS. 8A-8C illustrate three different computer programs for implementing a portion of an MLN (a subnet) on a set of Tiles. Each example implements the subnet $$Y = F(W1X1 + W2X2 + W3X3 + W4X4) \quad (2)$$

where Xn are matrices computed by prior nodes, Wn are corresponding weights, and F( ) is a non-linear operator. Pn are intermediate products. The implementation in FIG. 8A utilizes a low number of Tiles, the implementation in FIG. 8B has low latency, and the implementation in FIG. 8C has high throughput. In all of these figures, each row shows the instructions executed by a different Tile. Each column shows a different time period, where time is designated in cycles C. For purposes of this example, matrix multiplications are assumed to take 8 cycles, Tile to Tile transfers take 2 cycles, and all other instructions take 4 cycles.

In FIG. 8A, the compiler creates a computer program in which all of the instructions are executed by a single Tile 1. In cycles 1-4, Tile 1 loads the data for matrices W1 and X1 into its local memory (e.g., L1 memory). In cycles 5-12, Tile 1 executes the instruction to matrix multiply W1 times X1 and the result is stored in local memory for Tile 1. In cycles 13-24, Tile 1 repeats this process for W2 and X2. In cycles 25-28, Tile 1 adds the two partial products P1 and P2. This process repeats in cycles 29-60, at which point Tile 1 has computed the sum of all the matrix multiplications Wn times Xn. In cycles 61-64, Tile 1 executes the instruction to apply the nonlinear operator F. In cycles 65-68, the result Y is stored. Only one Tile is used to complete the computation, but the computation takes 68 cycles to complete.

In FIG. 8B, the computer program calculates Y with minimum latency, completing the computation in 32 cycles. In cycles 1-12, the partial products of Wn times Xn are computed for all of the n, using four separate Tiles. These partial products are then summed, but this requires some Tile-to-Tile data transfer. In cycles 13-14, the partial product P1 is transferred from Tile 1 to Tile 2. This is indicated by the Move command for Tile 1. [P1 available] for Tile 2 indicates that Tile 2 receives P1 as a result of the Move command executed by Tile 1. P1 is then summed with P2 by Tile 2 in cycles 15-18. In parallel during the same cycles, Tiles 3 and 4 sum P3+P4. This repeated in cycles 19-24 to sum the two partial sums P5+P6. Tile 4 applies the operator F( ) and then stores the result in cycles 25-32. The additional Tiles allow for hardware parallelism, particularly in computing the matrix multiplies. This shortens the total computation time from 68 cycles to 32 cycles.

In FIG. 8C, the computer program calculates Y in a manner that takes advantage of the hardware parallelism of FIG. 8B, but with higher throughput. Each Tile is responsible for one computation, with the result then transferred to other Tiles to perform other computations. Cycles 1-12 are the same as in FIG. 8B. Tiles 1-4 compute the partial products of Wn times Xn. However, these partial products P1-P4 are then transferred to Tiles 5-6, which sum P1+P2 and P3+P4, respectively, in cycles 13-18. These results are transferred to Tile 7, which sums them in cycles 19-24. The total sum P7 is transferred to Tile 8, which applies the operator F( ) in cycles 25-30. The overall computation takes somewhat longer than FIG. 8B (34 cycles versus 32 cycles) because this implementation has an extra Tile-to-Tile data transfer. However, a new input sample may be started in Tiles 1-4 after cycle 14, whereas a new input sample may not be started in Tiles 1-4 of FIG. 8B until after cycle 32.

Figure 9A:
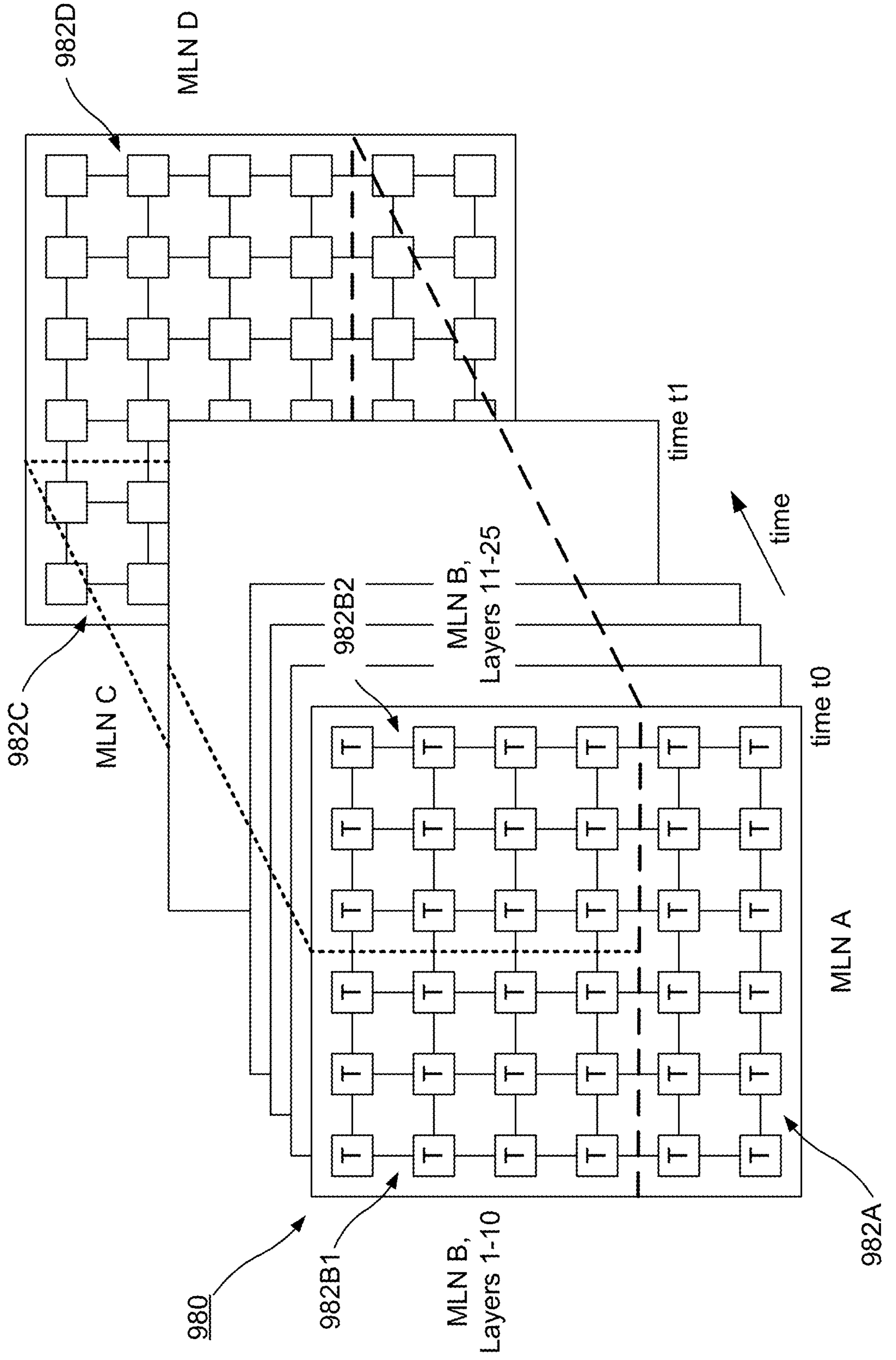
FIG. 9A illustrates partitioning a mesh of Tiles to execute different subnets.
Figure 9B:
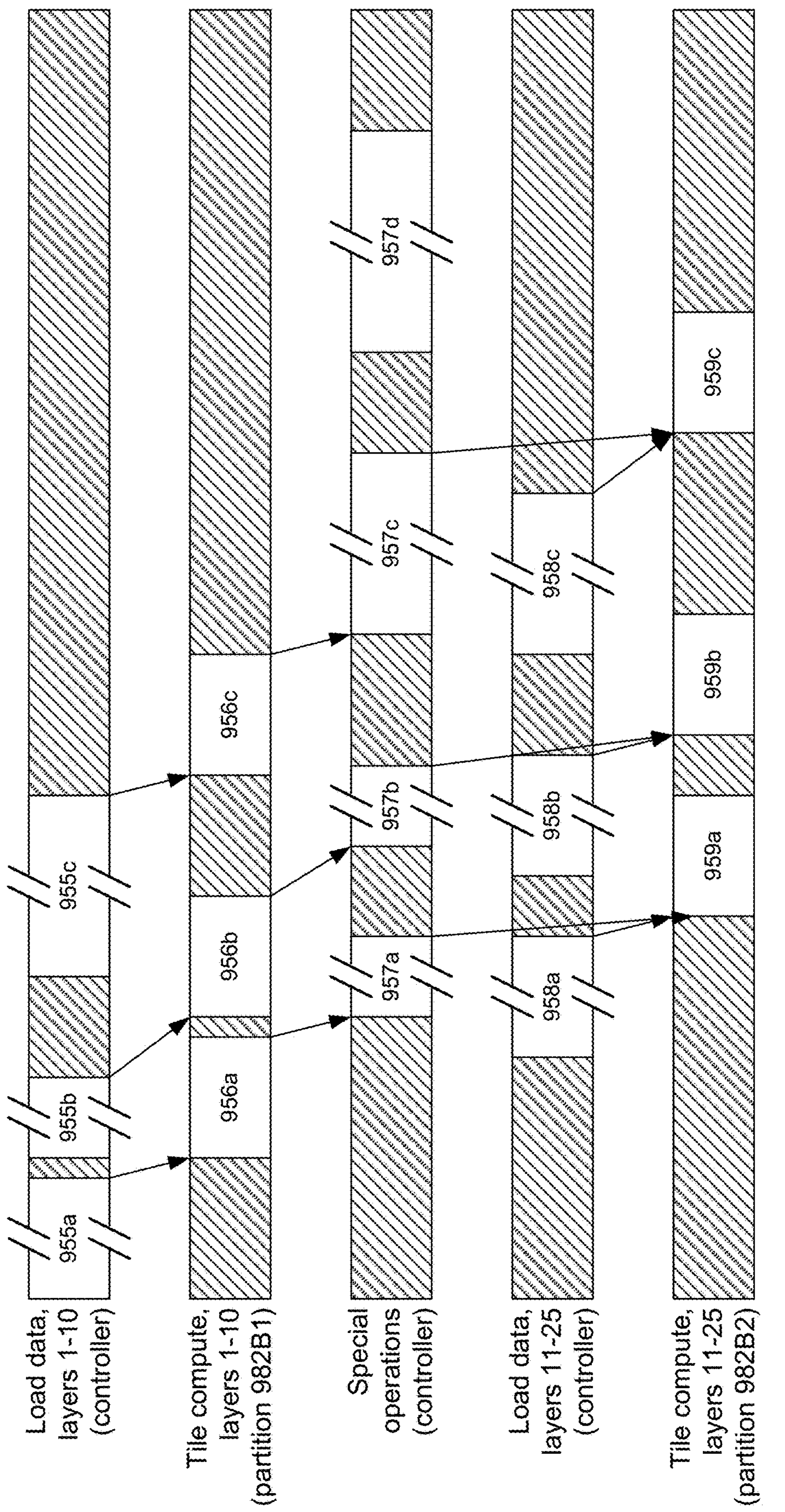
FIG. 9B illustrates deterministic and non-deterministic phases for different partitions.

FIG. 8 provided different examples of how a particular MLN subnet may be allocated to Tiles. FIGS. 9A and 9B illustrate partitioning the mesh of Tiles to different subnets. In FIG. 9A, the MLA includes a 6×6 mesh (element 980 in FIG. 9A) of Tiles. From time t0 to t1, the mesh 980 is utilized to implement two different MLNs: MLN A and MLN B. The Tiles are divided into three partitions 982A, 982B1 and 982B2. Partition 982A implements MLN A, partition 982B1 implements the first 10 layers of MLN B, and partition 982B2 implements the remaining 15 layers of MLN B. MLN B may be partitioned in this manner because some off-Tile operations may be required between layers 10 and 11. Maybe the output of layer 10 requires a computation that is performed off-Tile in a non-deterministic manner, or maybe layers 11-25 require data that cannot be loaded in a manner consistent with the static scheduling of layers 1-10. After time t1, the mesh 980 continues to implement MLN B using partition 982A, but MLN A is replaced by MLNs C and D using partitions 982C and 982D respectively.

FIG. 9A shows a progression over time. The front diagram shows the partitioning at an earlier time and the subsequent diagrams show the partitioning at later times. The times are indicated to the lower right of the diagrams. At time t0, the mesh is partitioned so that the bottom 2×6 Tiles implement MLN A, the upper left 4×3 Tiles implement MLN B layers 1-10, and the upper right 4×3 Tiles implement MLN B layers 11-25. At time t1, MLN B is no longer required and is replaced by MLNs C and D. The upper left 4×2 Tiles now implement MLN C, and the upper right 4×4 Tiles now implement MLN D.

Note that each of these partitions may run deterministic and non-deterministic phases separately from each other. Partition 982A implements MLN A, which is independent of MLN B implemented by partitions 982B1 and 982B2. Thus, partition 982A may run separately from the other two partitions. At time t1, partition 982A may continue to run, unaffected by the change from MLN B to MLNs C and D.

FIG. 9B illustrates deterministic and non-deterministic phases for partitions 982B1 and 982B2. The format is similar to FIG. 1B. Each row represents different phases of instructions. The white regions of each row denote the execution of instructions and the hashed regions indicate idling. Non-deterministic phases are indicated by breaks in the rectangles. From top to bottom, the rows are the following. The top row has instructions to load data for the computations of layers 1-10 from DRAM into the MLA. This data will be consumed by Tile partition 982B1. Referring to FIG. 2A, this is performed by the controller 277 and these phases 955 are non-deterministic because they are loads from DRAM. The second row has the deterministic phases 956 of statically scheduled Tile instructions that implement the computations for layers 1-10. Similarly, the fourth row has non-deterministic phases 958 for loading data for the computation of layers 11-25, and the bottom row has the deterministic phases 959 of statically scheduled Tile instructions that implement these computations, respectively. The middle row has other non-deterministic instructions 957. In this example, this includes non-deterministic computations 957*a-c* that occur outside the MLA, and instructions 957*d* to reparation the MLA.

The suffixes indicate different input samples. The phases that end in -a apply the MLN to one input sample, the phases that end in -b apply the MLN to the next input sample, etc. The arrows indicate dependencies. Consider first input sample a. A controller loads 955*a* the relevant data (input values, weights, biases, operator parameters) from DRAM into the MLA memory. After this is completed, the Tiles 982B1 may perform their computations 956*a* using this data. The Tile output is transferred off-chip for a computation 957*a* that is not performed by the Tiles. In the meantime, the controller loads 958*a* the relevant data for layers 11-25. When data from both non-deterministic phases 957*a* and 958*a* are available, Tile partition 982B2 performs its computations 959*a*. The Tile computations within each phase 956*a* and 959*a* are statically scheduled within their respective non-deterministic phases, but the time between phases

956*a* and 959*a* may vary. The processing of input samples b and c have the same dependencies and general flow.

At some point (time t1 in FIG. 9A), the controller ends execution of MLN B and starts execution of MLNs C and D. The compiler has provided different schedules with different partitions of the Tiles as partition 982C for MLN C and partition 982D for MLN D. This is phase 957*d*. The process then continues with each of the active partitions 982A, C, D execution instructions to implement their respective MLNs.

The approach based on static scheduling described above is not restricted to the examples described above. For example, different network topologies of Tiles may be used.

Figure 10:
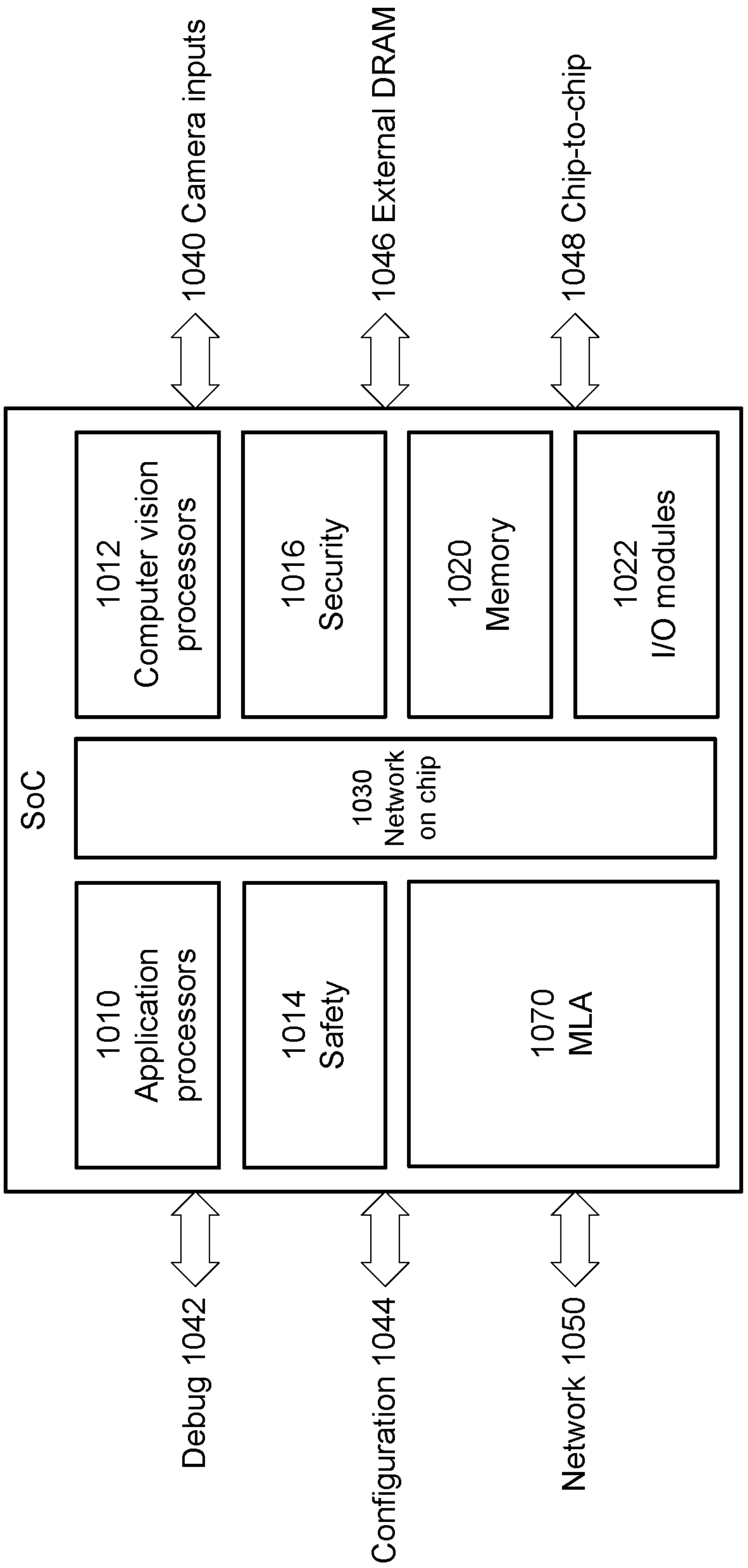
FIG. 10 is a block diagram of an integrated circuit product that includes an MLA.

FIG. 10 is a block diagram of an integrated circuit that includes an MLA 1070. In other words, other components may be included on the same die as the MLA. This example includes the following additional blocks: application processor 1010 (e.g., general purpose CPU running applications), computer vision processor 1012 (or other types of application-specific processors), safety 1014, security 1016, additional SRAM (memory) 1020 and input/output circuitry 1022. It also includes a network 1030 for communication between the different components. This type of semiconductor chip may be referred to as a system-on-chip (SoC).

The connections to the external world include camera inputs 1040 for the computer vision processors, ports for debug 1042 and configuration 1044, a connection 1046 to external memory (e.g., DRAM), chip-to-chip connections 1048, and network connections 1050 (e.g., Ethernet and PCIe).

The SoC of FIG. 10 may be combined with other components to perform various tasks in edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time.

In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. For example, image samples may be input to the computer vision processors 1012, which perform initial operations such as edge detection and enhancement, contrast enhancement, motion detection, and optical flow. Raw and/or processed images may be then input to the MLA 1070 for analysis by the machine learning network. The MLA may also receive other inputs, such as metadata from other sources and data from other sensors. The application processors 1010 may also perform various functions in the overall pipeline and may also serve as a master controller that coordinates operation of the MLA and the other programmable processors in the pipeline.

Edge devices may be portable with less power available for computations compared to, for example, cloud-based server farms. It may also be desirable for the computing pipeline within the edge device to perform tasks without utilizing cloud-based or other remote compute resources. In some implementations, the MLA implements computations in the machine learning network at a performance of at least 50 TOPs (50 trillion operations per second) at a power consumption of not more than 5 watts. The performance may be increased by increasing the number of Tiles in the mesh or the number of Tile meshes on the die.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method comprising, by a compiler:

receiving a description of a machine learning network, the machine learning network comprising a plurality of interconnected layers and the description specifying computations performed by the layers and also specifying interconnections between the layers;

generating instructions that implement the machine learning network on interconnected processing elements on a semiconductor die, wherein:

the instructions include compute instructions that implement the computations specified in the description;

the compute instructions for layers in the machine learning network are assigned to groups of processing elements for execution; based on (a) a number of processing elements on the semiconductor die, (b) a measure of a complexity of the computations for that layer, (c) data transfer paths to and from the processing elements, and (d) data dependencies resulting from the interconnections between layers specified in the description; and the assignment of compute instructions to groups of processing elements allows the compiler to statically schedule execution of the instructions that implement the machine learning network; and outputting the instructions.

2. The method of claim 1 wherein the groups of processing elements assigned to individual layers are contiguous blocks of processing elements, and the contiguous blocks for adjacent layers are also adjacent.

3. The method of claim 1 wherein the compute instructions are assigned to groups of processing elements based on reducing processing time for executing the machine learning network.

4. The method of claim 1 wherein the compute instructions are assigned to groups of processing elements based on reducing power consumption for executing the machine learning network.

5. The method of claim 1 wherein the compute instructions are assigned to groups of processing elements based on reducing data transfers for executing the machine learning network.

6. The method of claim 1 wherein the compute instructions are assigned to groups of processing elements based on reducing accesses to off-chip memory for executing the machine learning network.

7. The method of claim 1 wherein the groups of processing elements for adjacent layers operate in a pipelined manner when executing the machine learning network.

8. The method of claim 1 wherein the groups of processing elements for adjacent layers execute instructions during overlapping time periods according to the static schedule.

9. The method of claim 1 wherein some interconnections connect layers that are not directly adjacent to each other.

10. The method of claim 1 wherein assigning compute instructions to groups of processing elements is performed iteratively.

11. The method of claim 1 wherein generating instructions comprises generating multiple sets of instructions based on different assignments of compute instructions to groups of processing elements.

12. The method of claim 2 wherein the contiguous blocks are rectangular in shape.

13. The method of claim 2 wherein the processing elements contain level 1 (L1) memory, and the contiguous blocks assigned to a first layer and to a last layer have direct access to level 2 (L2) memory.

* * * * *